United States Patent
Imamoto

(10) Patent No.: US 8,543,840 B2
(45) Date of Patent: Sep. 24, 2013

(54) DATA PROCESSING APPARATUS, DATA PROCESSING SYSTEM, AND METHOD FOR CONTROLLING THE SAME

(75) Inventor: Yoshiharu Imamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 13/094,103

(22) Filed: Apr. 26, 2011

(65) Prior Publication Data

US 2011/0271121 A1    Nov. 3, 2011

(30) Foreign Application Priority Data

Apr. 28, 2010 (JP) ................................. 2010-104303
Mar. 16, 2011 (JP) ................................. 2011-058102

(51) Int. Cl.
*G06F 21/00*    (2006.01)

(52) U.S. Cl.
USPC ............... 713/193; 713/190; 726/27; 726/31; 369/272; 369/286; 369/292

(58) Field of Classification Search
USPC ............................................... 713/189, 193
See application file for complete search history.

(56) References Cited

U.S. PATENT DOCUMENTS

| | | | |
|---|---|---|---|
| RE39,297 E | * | 9/2006 | Oshima et al. ............. 369/272.1 |
| 7,673,154 B2 | * | 3/2010 | Sako et al. ..................... 713/193 |
| 2008/0232593 A1 | * | 9/2008 | Hsu et al. ....................... 380/277 |

OTHER PUBLICATIONS

"On the capacity of generalized write-once memory with state transitions described by an arbitrary directed acyclic graph"; Fu et al; Journal: IEEE Transactions on Information Theory, 1999, 45 (1) 308-313.*

* cited by examiner

*Primary Examiner* — Taghi Arani
*Assistant Examiner* — Jason Lee
(74) *Attorney, Agent, or Firm* — Canon USA Inc. IP Division

(57) ABSTRACT

A data processing apparatus acquires content, generates an encryption key by using an initial value written in an unwritten memory block in a write-once recording medium, encrypts the content by using the encryption key, and writes to the write-once recording medium the encrypted content and an address table for identifying the memory block storing the initial value used for generating the encryption key.

8 Claims, 11 Drawing Sheets

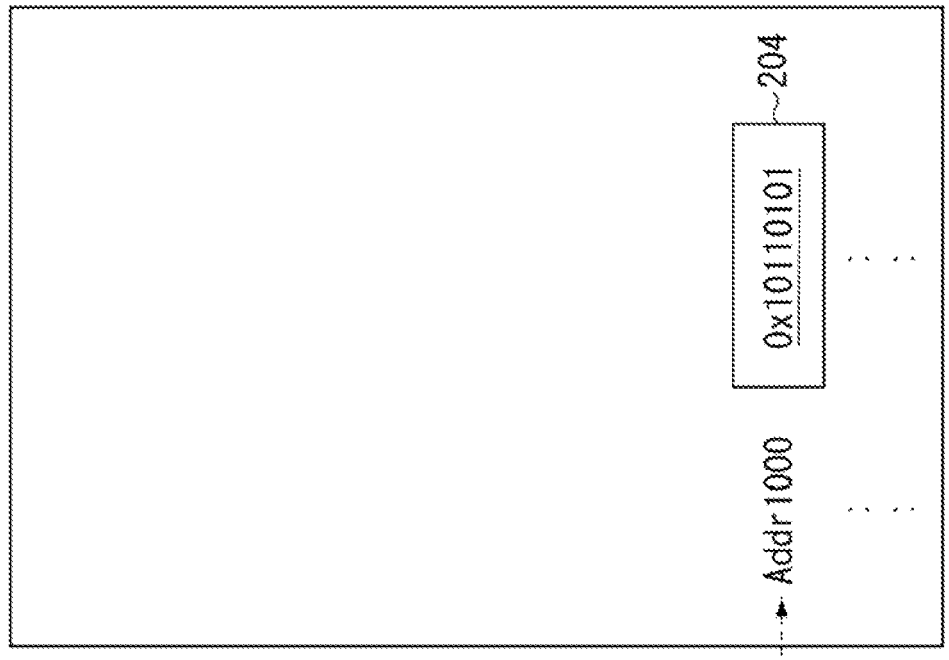
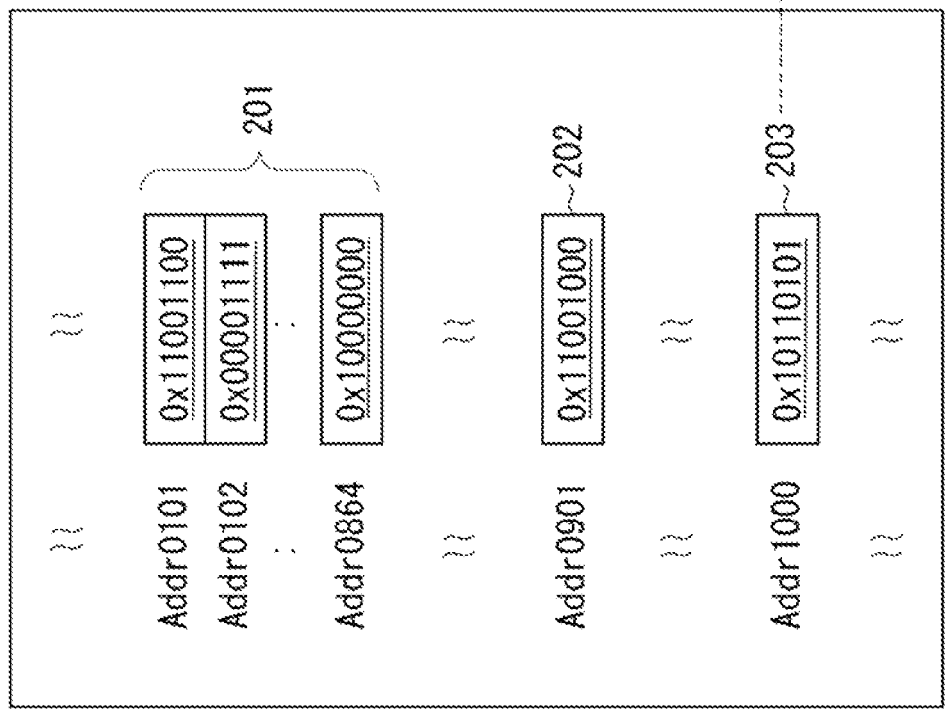

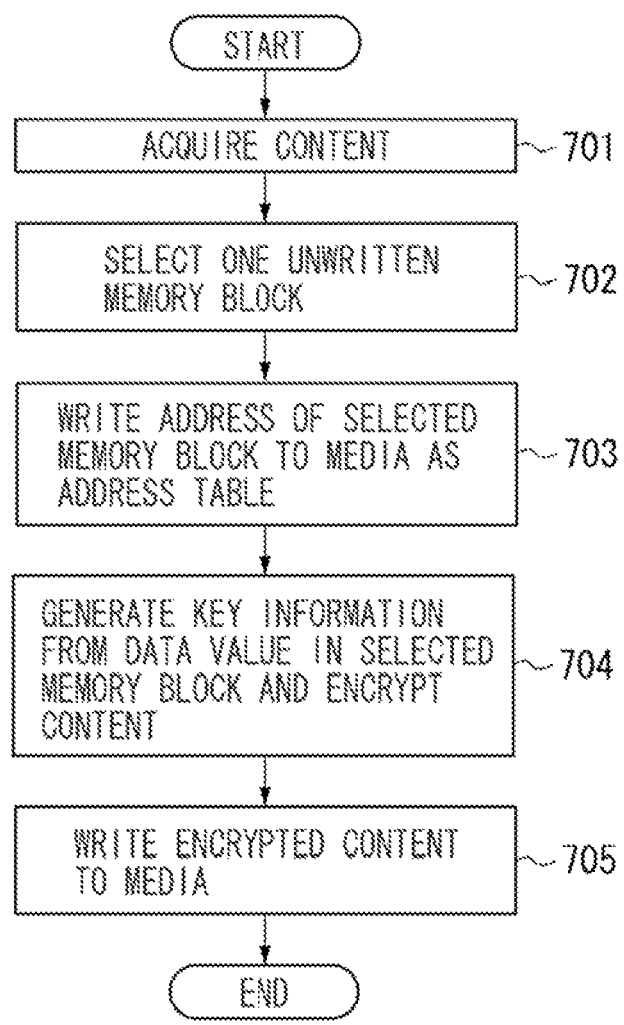

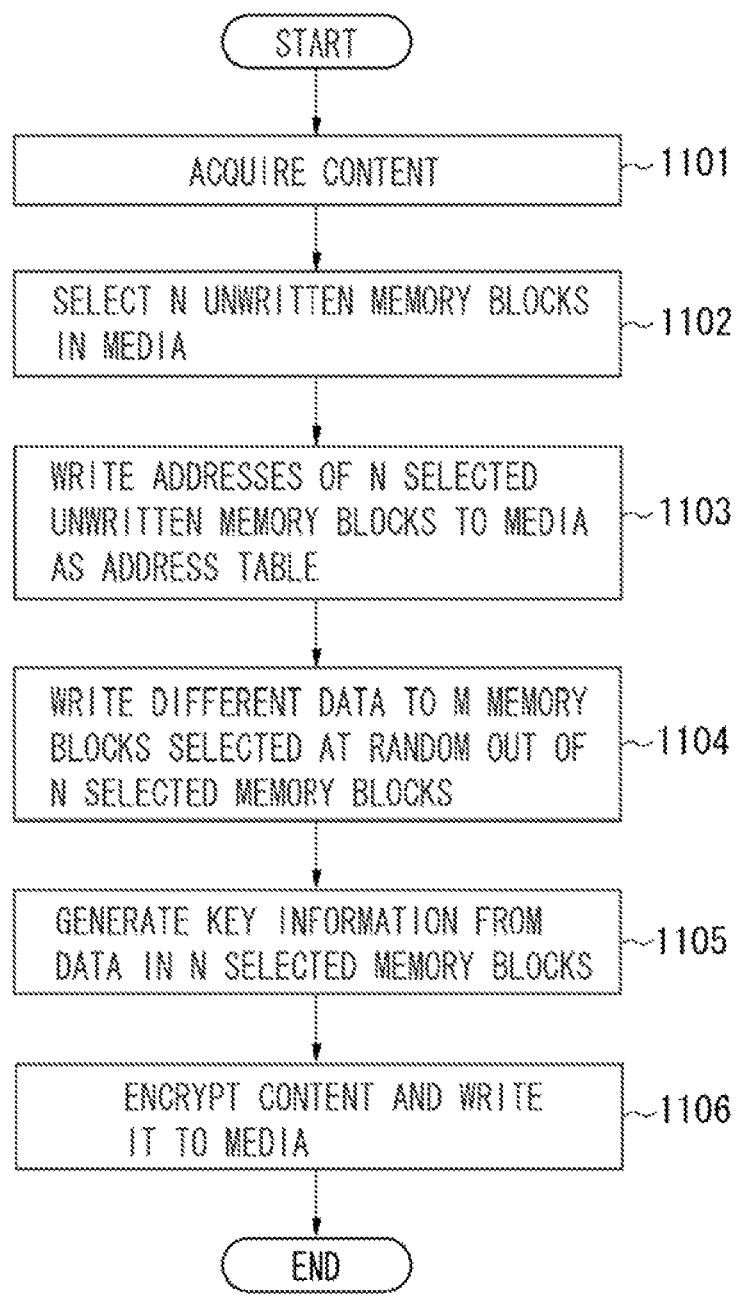

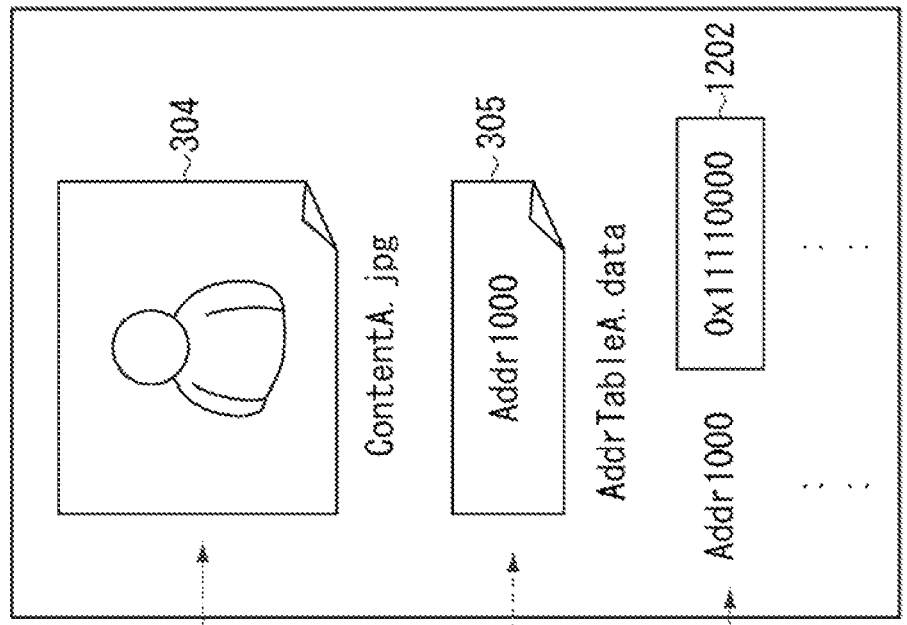
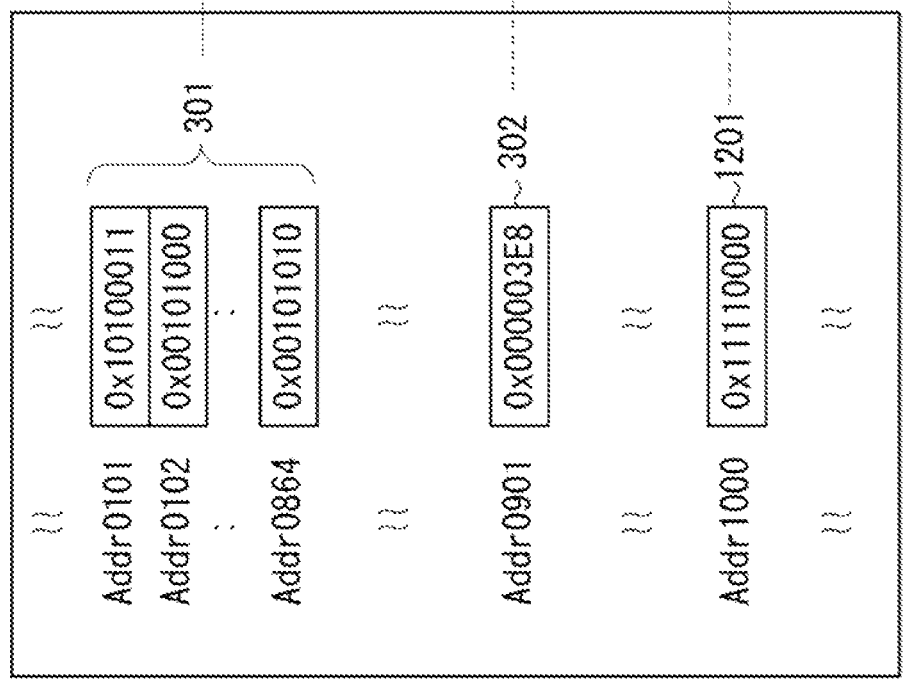
FIG. 9A
FIG. 9B

DATA PROCESSING APPARATUS, DATA PROCESSING SYSTEM, AND METHOD FOR CONTROLLING THE SAME

BACKGROUND OF THE INVENTION

1. Field of the Invention

The present invention relates to a technique for managing encrypted data on a write-once recording medium.

2. Description of the Related Art

Conventional write-once recording media, also referred to as write once read many (WORM) media, are known to prevent written data from being physically changed or erased.

Generally, to reliably erase data written to a WORM medium, it is necessary to physically destroy the recording medium itself. Another conventional technique related to WORM media is known to change data not physically but logically. This technique has a specific rule. For example, an alternative area is provided for a storage area having written data in the WORM medium, and the alternative area is preferentially read as the original storage area.

write-once recording media are not provided with a function of physically erasing data. Therefore, conventionally, to safely erase data written to a write-once recording medium, i.e., to acquire a state where reading and analyzing data are very difficult, the medium itself has to be destroyed.

SUMMARY OF THE INVENTION

The present invention is directed to a data processing apparatus capable of disabling correct reading of data stored on a write-once recording medium without requiring physical destruction of the write-once recording medium.

According to an aspect of the present invention, a data processing apparatus capable of reading and writing data from/to a write-once recording medium includes an acquisition unit configured to acquire content, an encryption unit configured to generate an encryption key by using an initial value written in an unwritten memory block in the write-once recording medium and to encrypt the content by using the encryption key, and a writing unit configured to write to the write-once recording medium the encrypted content and an address table for identifying the memory block storing the initial value used for generating the encryption key.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A and 2B illustrate an initial state of a WORM medium before content is written thereto.

FIG. 4 is a flow chart illustrating processing performed by a media writing apparatus.

FIG. 8 is a flow chart illustrating processing performed by the media writing apparatus.

FIGS. 9A and 9B illustrate a state of the WORM medium after the content is destroyed.

DESCRIPTION OF THE EMBODIMENTS

Various exemplary embodiments, features, and aspects of the invention will be described in detail below with reference to the drawings.

Write once read many (WORM) type recording media that enable data to be written once and prevent the written data from being erased and changed are referred to as WORM media. Applicable media are not limited to WORM media but any types of write-once recording media are applicable. In the present exemplary embodiment, content refers to electronic data composed of digital information such as text, images, moving pictures, documents, and sounds.

Figure 1:
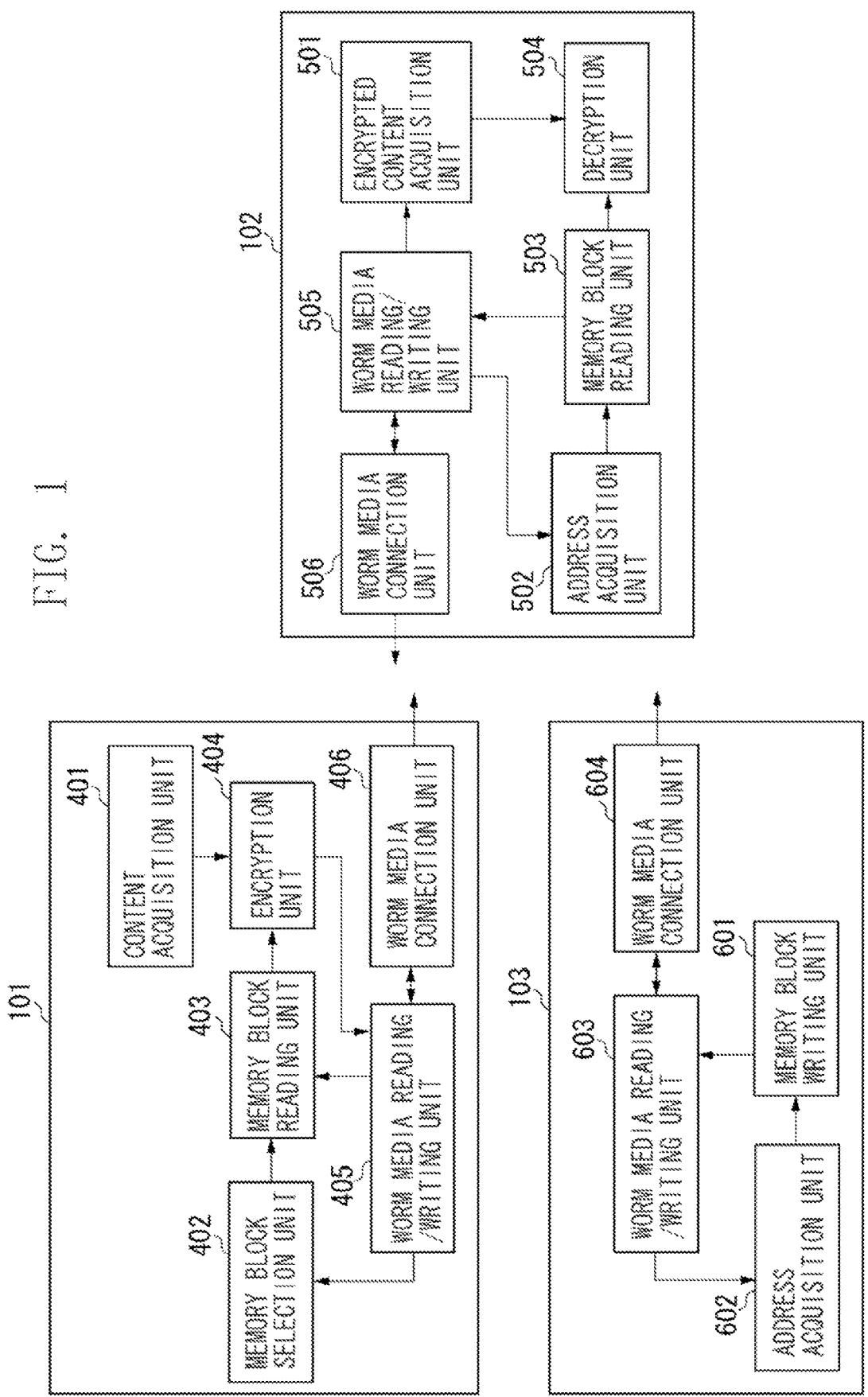
FIG. 1 illustrates configurations of data processing apparatuses in a data processing system according to first and second exemplary embodiments of the present invention.

FIG. 1 illustrates data processing apparatuses in a data processing system according to first and second exemplary embodiments of the present invention. A media writing apparatus 101 includes a content acquisition unit 401, a memory block selection unit 402, a memory block reading unit 403, an encryption unit 404, a WORM media reading/writing unit 405, and a WORM media connection unit 406. The media writing apparatus 101 generates key information from information (a seed set) written to a WORM medium, encrypts content by using the key information, and writes the encrypted content to the WORM medium by using a method in FIGS. 3A and 3B (described below). A seed set in the present invention refers to a set of data values (a data group) written in the storage area in the WORM medium. An encryption key for the content is generated from the seed set. The seed set includes at least (changeable) data values in an unwritten storage area in the WORM medium. The seed set may include (unchangeable) data values in the written storage area in the WORM medium. A user who knows a correct seed set can generate a correct encryption key. The media viewing apparatus 102 re-generates key information from the information written to the WORM medium and decrypts the encrypted content written by the media writing apparatus 101. The media destruction apparatus 103 produces a state where key information cannot be re-generated from information written to the WORM medium by using a method described below, thus preventing decryption of the encrypted content. Producing a state where key information (decryption key) for decrypting the encrypted content cannot be generated is substantially equivalent to destroying the content.

Descriptions will be made below on the premise that the data processing apparatuses (the media writing apparatus 101, the media viewing apparatus 102, and the media destruction apparatus 103) are separate apparatuses and configured to send and receive data by using WORM media via the WORM media connection unit 406.

However, the data processing apparatuses according to the present invention are not limited thereto. For example, a plurality of data processing apparatuses may be integrated into one apparatus having all of their functions. In this case, processing units having a similar function, such as the WORM media reading/writing units 405, 505, and 603, and the WORM media connection units 406, 506, and 604, may be respectively achieved by one processing unit.

The WORM media reading/writing unit 905 is provided with a function of reading various pieces of data written to the WORM medium connected to the media writing apparatus 101, and a function of writing data received from other processing units to the WORM medium.

The WORM media connection unit 906 connects with the WORM medium connected to the WORM media writing apparatus 101 to control data input and output from/to the WORM medium. The WORM media connection unit 406 may be provided with a mechanism for ejecting the connected WORM medium from the WORM media writing apparatus 101 in response to a user's instruction.

The content acquisition unit 401 acquires content to be written to the WORM medium and outputs the content to the encryption unit 404. For example, the content acquisition unit 401 reads content from a compact disc read only memory (CD-ROM) and acquires image data from an imaging unit. The memory block selection unit 402 selects necessary number of unwritten memory blocks described below for the WORM medium connected with the WORM media reading/writing unit 405. Then, the memory block selection unit 402 outputs to the memory block reading unit 403 the addresses of the unwritten memory blocks as memory blocks storing a seed set. The memory block reading unit 403 reads from the WORM medium the data group written in the memory blocks at the address selected by the memory block selection unit 402, and outputs the data group to the encryption unit 404. Specifically, the memory block reading unit 403 outputs, as a seed set, to the encryption unit 404 an initial value written in the memory blocks at a specific address in the WORM medium. By using the initial value read by the memory block reading unit 403 as key information for encryption or an initial vector, the encryption unit 404 encrypts the content based on an encryption algorithm represented by the advanced encryption standard (AES). Then, the encryption unit 409 outputs the encrypted content to the WORM media reading/writing unit 405. Since various methods for generating key information from a seed set are publicly known, no specific example will be illustrated. As a simple example, the data of the above-mentioned seed set may be used as key information as it is. The WORM media reading/writing unit 405 writes the encrypted content to the WORM medium via the WORM media connection unit 406. Specific processing collectively performed by the above-mentioned processing units will be described below.

The media viewing apparatus 102 reads the encrypted content from the WORM medium to which the encrypted content was written by the media writing apparatus 101, and decrypts the content. The media viewing apparatus 102 includes an encrypted content acquisition unit 501, an address acquisition unit 502, a memory block reading unit 503, a decryption unit 504, the WORM media reading/writing unit 505, and the WORM media connection unit 506. The WORM media reading/writing unit 505 is provided with a function of reading various pieces of data written to the WORM medium connected to the media viewing apparatus 102 via the WORM media connection unit 506. The WORM media reading/writing unit 505 is also provided with a function of writing data received from other processing units to the WORM medium via the WORM media connection unit 506. The WORM media connection unit 506 connects with the WORM medium connected to the WORM media viewing apparatus 102 to control data input and output from/to the WORM medium. The WORM media connection unit 506 may be provided with a mechanism for ejecting the connected WORM medium from the WORM media viewing apparatus 102 in response to the user's instruction.

The encrypted content acquisition unit 501 reads the encrypted content from the WORM medium, and outputs it to the decryption unit 504. The address acquisition unit 502 reads from the WORM medium an address table corresponding to the encrypted content to be decrypted, and acquires an address (information for identifying memory blocks) in the WORM medium storing the data group necessary to decrypt the encrypted content. In this case, the data value in the memory blocks specified by the address in :he WORM medium is used as a seed set. The role of the above-mentioned address table will be described below. The memory block reading unit 503 reads the data group from the memory blocks corresponding to the address acquired by the address acquisition unit 502. By using the above-mentioned data group as a seed set, the decryption unit 504 decrypts the encrypted content by re-generating key information through the same calculation processing as that by the encryption unit 404 of the media writing apparatus 101. The user displays the decrypted content on a display unit (not illustrated) and prints it from a printing unit for viewing. When the decrypted content is sound, it will be output from a speaker. The above-mentioned encryption unit 404 generates an encryption key according to a common key cryptosystem from the above-mentioned seed set, and applies encryption processing to the content by using the encryption key. The algorithm for generating an encryption key is not limited to the above-mentioned common key cryptosystem as long as the following condition is satisfied both on the encryption and decryption sides: the same encryption key and the same decryption key can be generated when the above-mentioned seed set is identical on both sides.

The media destruction apparatus 103 writes data in a portion of the WORM medium to which the encrypted content was written by the media writing apparatus 101, thus substantially destroying the encrypted content. The media destruction apparatus 103 includes a memory block writing unit 601, an address acquisition unit 602, a WORM media reading/writing unit 603, and a WORM media connection unit 604. The WORM media reading/writing unit 603 is provided with a function of reading various pieces of data written to the WORM medium connected to the media destruction apparatus 103 via the WORM media connection unit 604. The WORM media reading/writing unit 603 is also provided with a function of writing data received from other processing units to the WORM medium via the WORM media connection unit 604. The WORM media connection unit 604 connects with the WORM medium connected to the WORM media destruction apparatus 103 to control data input and output from/to the WORM medium. The WORM media connection unit 604 may be provided with a mechanism for ejecting the connected WORM medium from the WORM media destruction apparatus 103 in response to the user's instruction.

The address acquisition unit 602 reads from the WORM medium an address table corresponding to the encrypted content, and acquires an address (information for identifying memory blocks) in the WORM medium storing a seed set necessary to decrypt the encrypted content. This function is equivalent to the above-mentioned function of the address acquisition unit 502. The memory block writing unit 601 generates meaningless data such as a random number or a fixed value and writes the meaningless data in the memory block at the address acquired by the address acquisition unit 602.

The media destruction apparatus 103 is provided with a function of detecting that the encrypted content has been written to the WORM medium by the media writing apparatus 101 according to the present exemplary embodiment. This detection function will be achieved when the media destruction apparatus 103 acquires information for identifying the media writing apparatus 101 based on a certain method. For example, the detection function can be achieved when the media writing apparatus 101 writes an identifier indicating that the encrypted content and the address table have been written in each of the following exemplary embodiments in memory blocks at a predetermined address in the WORM medium. Then, the media destruction apparatus 103 executes the function of destroying the seed set in the WORM medium on the premise that the encrypted content has been written to the WORM medium by the media writing apparatus 101.

<First Embodiment>

A technique for preventing the encrypted content from being decrypted will be described below with reference to the accompanying drawings. The term, "destruction" means destroying an encryption key of content, not destroying the content itself, to disable correct reading of the content.

Figure 3A:
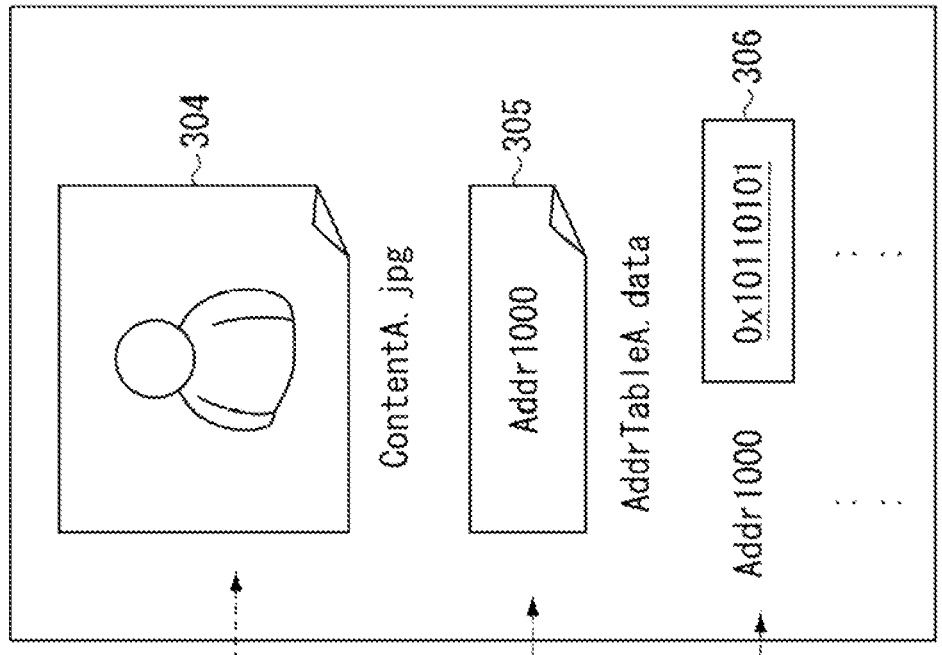
FIGS. 3A and 3B illustrate a state of the WORM medium after content is written thereto.
Figure 3B:
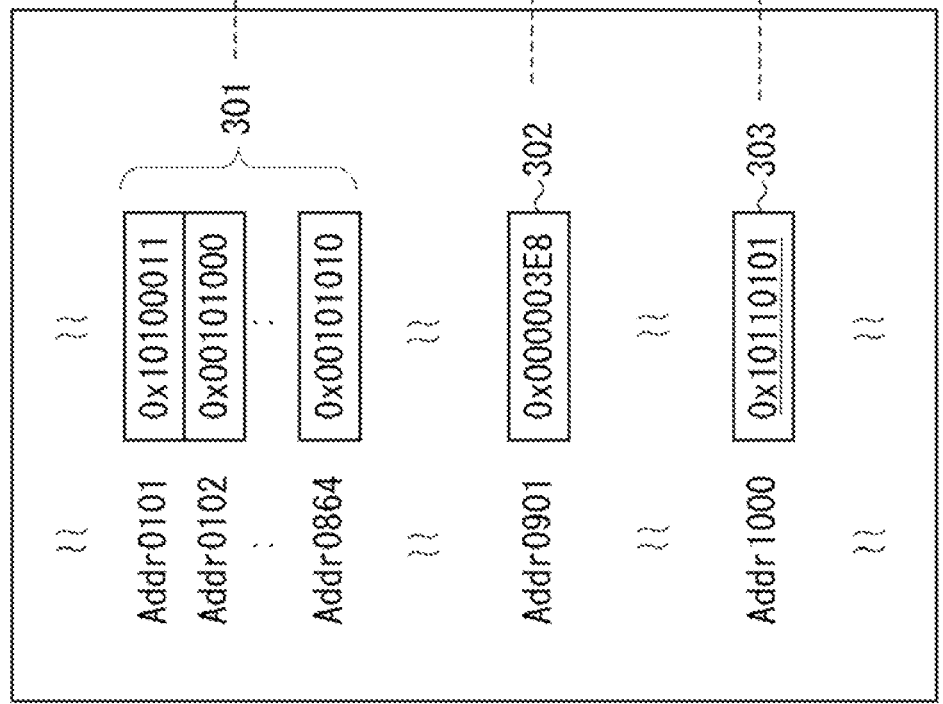

FIGS. 2A and 2B illustrate an initial state of the WORM medium before content is written thereto by the media writing apparatus 101. FIGS. 3A and 3B illustrate a state of the WORM medium after content has been written thereto by the media writing apparatus 101. FIGS. 9A and 9B illustrate a state of the WORM medium after the content has been substantially destroyed by the media destruction apparatus 103. FIGS. 2A, 3A, and 9A specifically illustrate data strings written in memory blocks at respective addresses in the WORM medium. FIGS. 2B, 3B, and 9B visually illustrate memory blocks in FIGS. 2A, 3A, and 9A, respectively. A data value 204 in FIG. 2B corresponds to a memory block 203 in FIG. 2A. Content 304, an address table 305, and a data value 306 in FIG. 3B correspond to memory blocks 301, 302, and 303 in FIG. 3A, respectively. Further, a data value 1202 in FIG. 9B corresponds to a memory block 1201 in FIG. 9A.

Referring to FIGS. 2A, 2B, 3A, and 3B, memory blocks storing an underlined numerical value (for example, memory blocks 203, 303, and 306) indicate memory blocks in the WORM medium to which a data value has not yet been written by the user (unwritten memory blocks). An underlined numerical value indicates an initial value prewritten at the time of shipment of the WORM medium from a factory, not a data value intentionally written by the user. Data values (a data group) in such unwritten memory blocks can be overwritten only once in the future through writing processing. A memory block is a unit for controlling data writing to the WORM medium. A memory block is 32 bytes in size. For example, once a data value has been written to a certain memory block by a user's instruction, overwriting the same memory block is. inhibited.

Referring to FIGS. 3A and 3B, the memory block 301 at addresses Addr0101 to Addr0864 records encrypted content (ContentA.jpg 304), as illustrated by an arrow, encrypted by using key information generated from the data values in the memory block 301. Generation of the above-mentioned key information will be described below. Likewise, the memory block 302 at an address Addr0901 records a data value of the address table AddrTableA.data 305 used for decrypting the content ContentA.jpg 304. Such an address table including address information plays a role of indicating which memory block stores information (a seed set) necessary to generate key information. Since the address table AddrTableA.data 305 points to an address Addr1000, when generating key information, a data value written at the address Addr1000 (a data group 303 in FIG. 3A) will be referenced as a seed set. The data group 303 in FIG. 3A is written at the address Addr1000 pointed to by the address table AddrTableA.data 305. An initial value 0x10110101 is prewritten at the time of shipment from or manufacturing in a factory. The data group 303 corresponds to a data group 306 in FIG. 3B. Referring to FIG. 3A, the data group 302 (0x000003E8), corresponding to the address table 305, points to the address Addr1000. Since the initial value 0x10110101 is written in the data group 303 or 306 regardless of the user's intention, the initial value is not limited thereto.

In this way, the media writing apparatus 101 writes a data value indicating the content ContentA.jpg 304 in an unwritten area 201, and a data value indicating the address table AddrTableA.data 305 to an unwritten area 202. This produces a state where encrypted content and a seed set for key information exist in the WORM medium.

FIGS. 9A and 9B illustrate a state of the WORM medium after the content has been destroyed. .A point which should be noted in FIGS. 9A and 9B is that another data group 1201, corresponding to the data group 1202, is written instead of the data group 303, corresponding to the data group 306, in FIGS. 3A and 3B. As mentioned above, the data group 1201 is written at the address Addr1000 pointed to by the address table AddrTableA.data 305. Overwriting the data group to be used as a seed set with a different data value prevents the above-mentioned key information from being generated. As a result, it becomes substantially impossible to decrypt the encrypted content ContentA.jpg 304. Data values in the data group 1201, corresponding to the data group 1202, are written by the memory block writing unit 601 of the media destruction apparatus 103 in FIG. 1.

A point which should be noted with the present exemplary embodiment is that a seed set of a key for encryption or decryption is an initial value before writing data to the WORM medium by a user's intention. Thus, even with the WORM medium, writing a different data value in the address storing the seed set prevents the key from being restored.

FIG. 4 is a flow chart illustrating processing performed by the media writing apparatus 101. This processing is as illustrated mainly in FIGS. 3A and 3B. It is assumed that, before this processing is started, a target WORM medium stores data values as illustrated in FIGS. 2A and 2B. Specifically, the memory blocks 201, 202, and 203 are unwritten (underlined) memory blocks which are rewritable once.

In step 701, the content acquisition unit 401 acquires content. In step 702, aiming to generate key information for encrypting the content, the memory block selection unit 402 selects an unwritten memory block in the WORM medium. In step 703, the WORM media reading/writing unit 405 writes the address of the selected unwritten memory block to the WORM medium as the address table AddrTableA.data 305. In step 704, the encryption unit 404 generates key information by using the data value of the selected memory block as a seed set, and encrypts the content by using the key information. In step 705, the WORM media reading/writing unit 405 writes to the WORM medium the encrypted content (ContentA.jpg) acquired in step 704. With the above-mentioned steps, the state of the written data values illustrated in FIGS. 2A and 2B can be changed to the state of the written data values illustrated in FIGS. 3A and 3B.

Figure 5:
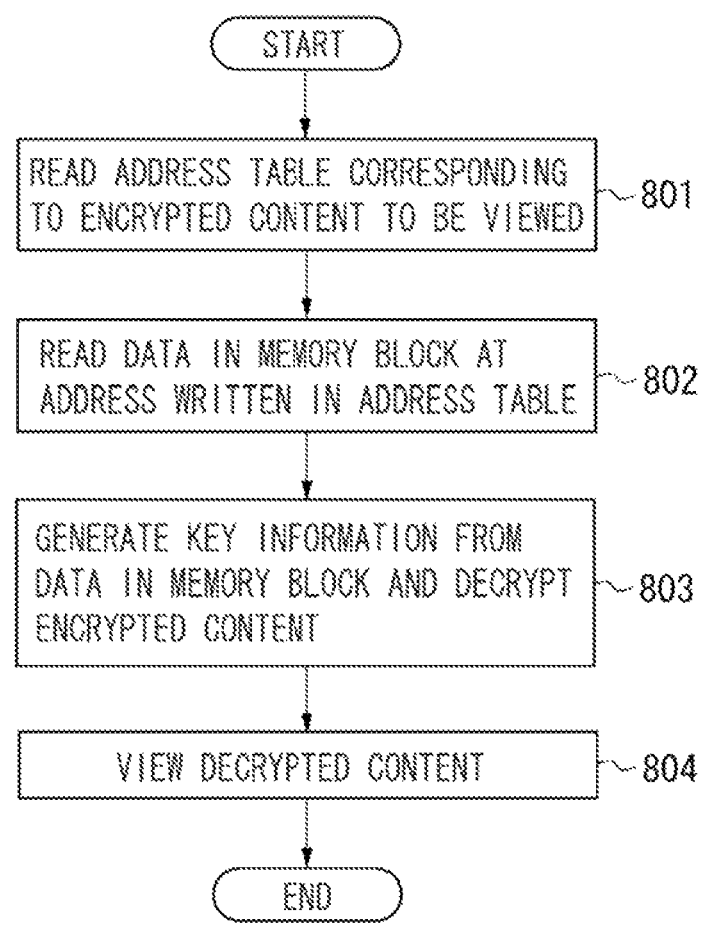
FIG. 5 is a flow chart illustrating processing performed by a media viewing apparatus.

FIG. 5 is a flow chart illustrating processing performed by the media viewing apparatus 102. In step 801, the address acquisition unit 502 reads from the WORM medium the above-mentioned address table corresponding to the encrypted content to be viewed. In step 802, the memory block reading unit 503 reads as a seed set the data group written in the memory block at the address written in the above-mentioned address table. In step 803, the decryption unit 504 generates key information based on the above-mentioned seed set and decrypts the encrypted content by using the key information. In step 804, the user views the decrypted content by using various methods. When the content is sound, it is output from a speaker.

Figure 6:
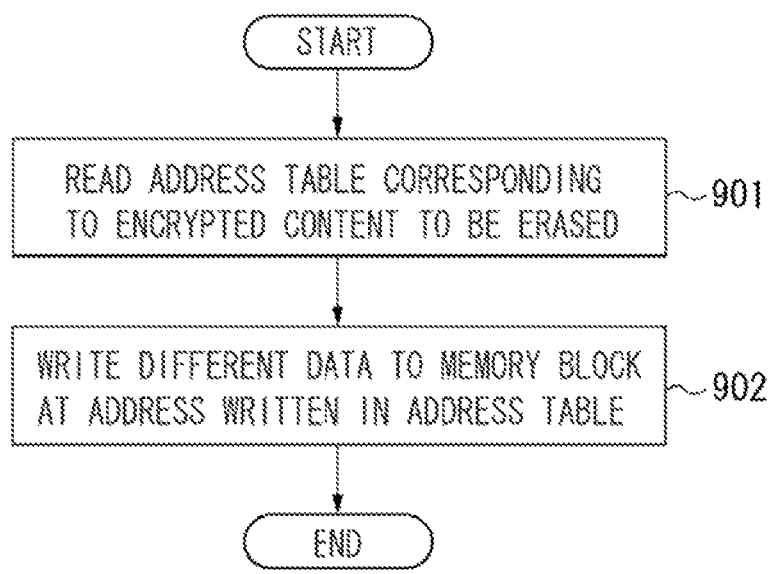
FIG. 6 is a flow chart illustrating processing performed by a media destruction apparatus.

FIG. 6 is a flow chart illustrating processing performed by the media destruction apparatus 103. In step 901, the address acquisition unit 602 reads from the WORM medium the above-mentioned address table corresponding to the encrypted content to be erased. In step 902, the memory block writing unit 601 writes a data value different from the currently written initial value (a random number value or a fixed value) in the memory block at the address written in the above-mentioned address table.

Although the present exemplary embodiment has specifically been described based on a case where a common key cryptosystem represented by the AES is applied, it is also easy to apply a public key cryptosystem represented by the RSA encryption system. In this case, the media writing apparatus 101 generates a secret key from the data value of the seed set and applies encryption processing to the content. On the other hand, the media viewing apparatus 102 generates a secret key from the data value of the seed set and further generates a public key from the secret key to enable decrypting the encrypted content. When the seed set is overwritten by the media destruction apparatus 103, the media viewing apparatus 102 cannot generate a correct secret key and accordingly finds it difficult to generate a public key.

<Second Embodiment>

In a case where all of unwritten memory blocks in the WORM medium have a known value such as an initial value 0x00000000, even when the seed set in the memory block pointed to by the address table is overwritten, key information can be generated by presuming the original initial value. The present exemplary embodiment makes it difficult to make such a presumption. A point which should be noted with the present exemplary embodiment is that the address table references a plurality of memory blocks and values of a part of the plurality of memory blocks are overwritten with any values. These overwritten data values in a part of the plurality of memory blocks are used as a part of the seed set to generate key information. As a result, key information is generated in encryption processing by using overwritten data values and an initial value as a seed set. Therefore, after the initial value is overwritten in erase processing, it becomes difficult to presume a seed set necessary to generate correct key information. Basic functions of the media writing apparatus 101, the media viewing apparatus 102, and the media destruction apparatus 103 are similar to those in the first exemplary embodiment and therefore duplicated descriptions will be omitted. A method for storing a data value in the WORM medium, which is different from that in the first exemplary embodiment, will be mainly described below.

Figure 7B:
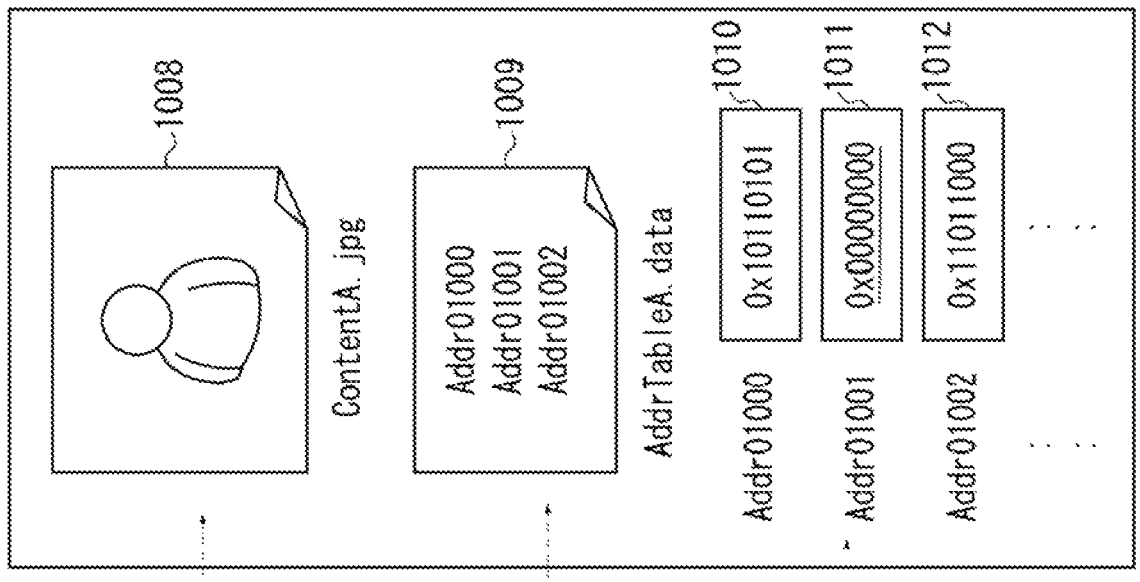
FIGS. 7A and 7B illustrate a state of the WORM medium after the content is written thereto.
Figure 7A:
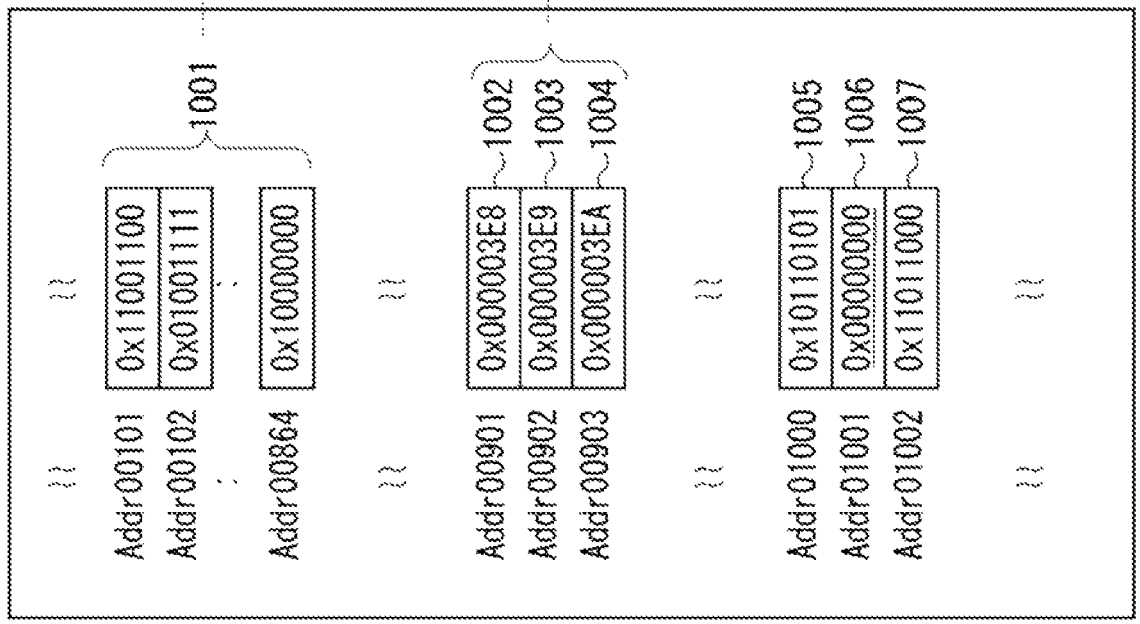

FIGS. 7A and 7B illustrate an exemplary method for writing data to the WORM medium according to the present exemplary embodiment. FIG. 7A specifically illustrates data strings written in memory blocks at respective addresses in the WORM medium. FIG. 7B visually illustrates memory blocks in FIG. 7A. Content 1008 in FIG. 7B corresponds to a memory block 1001 in FIG. 7A. An address table AddrTableA.data 1009 in FIG. 7B corresponds to memory blocks 1002, 1003, and 1004 in FIG. 7A. Data values 1010, 1011, and 1012 in FIG. 7B correspond to memory blocks 1005, 1006, and 1007 in FIG. 7A, respectively.

Referring to FIGS. 7A and 7B, an underlined data value 1006, for example, indicates an unwritten memory block in the WORM medium to which the user has not yet written data. The underlined numerical value indicates an initial value prewritten at the time of shipment of the WORM medium from a factory, not a data value intentionally written by the user. Data values (a data group) in such unwritten memory blocks can be overwritten only once in the future through writing processing. A memory block is a unit for controlling data writing to the WORM medium. A memory block is 32 bytes in size. Referring to FIG. 7B, the encrypted content ContentA.jpg 1008 is content encrypted by using key information generated from data values in memory blocks. Generation of the above-mentioned key information will be described below.

The encrypted content 1008 in FIG. 7B corresponds to the data group 1001 written at addresses Addr00101 to Addr00864 in the WORM medium illustrated in FIG. 7A. The address table AddrTableA.data 1009 in FIG. 7B is used when generating key information for encrypting the content ContentA.jpg 1008. Such an address table including address information plays a role of indicating which memory block stores information (a seed set) necessary to generate key information. The address table AddrTableA.data 1009 corresponds to data groups 1002 to 1004 written at addresses Addr00901 to Addr00903 in the WORM medium illustrated in FIG. 7A. Specifically, in the present exemplary embodiment, the address table specifies a plurality of memory blocks. Since the address table AddrTableA.data 1009 points to addresses Addr01000 to Addr01002, when generating key information, a data group written at the addresses Addr01000 to Addr01002 is referenced as a seed set.

The data group 1005 in FIG. 7A written at the address Addr01000 is pointed to by the address table AddrTableA.data 1009 as a seed set. Suppose that an initial value 0x00000000 has been written at the address Addr01000 at the time of shipment from or manufacturing in a factory. In the present exemplary embodiment, the initial value 0x00000000 of the data group 1003 is overwritten with a data value 0x10110101. Then, the data value 0x10110101 is used as a part of the seed set.

Likewise, the data group 1007 in FIG. 7A written at the address Addr01002 is also pointed to by the address table AddrTableA.data 1009 as a seed set. Suppose that an initial value 0x00000000 has been written at the address Addr01002 at the time of shipment from or manufacturing in a factory. In the present exemplary embodiment, the initial value 0x00000000 of the data group 1007 is overwritten with a data value 0x11011000. Then, the data value 0x11011000 is used as a part of the seed set.

Likewise, the data group 1006 written at the address Addr01001 is also pointed to by the address table AddrTableA.data 1009 as a seed set. Unlike the data groups 1005 and 1007, the data group 1006 is left unchanged from the initial value 0x00000000 written at the time of shipment from or manufacturing in a factory.

As mentioned above, in the present exemplary embodiment, data values overwritten from the initial value are used as a part of the seed set, and the initial value is used as the remaining part thereof.

FIG. 8 is a flow chart illustrating processing performed by the media writing apparatus 101 in the second exemplary embodiment. This processing is as illustrated mainly in FIGS. 7A and 7B. It is assumed that, before this processing is started, the content ContentA.jpg 1008 and the address table AddrTableA.data 1009 in FIG. 7B have not yet been written to the WORM medium, and the initial value 0x00000000 at the time of shipment from a factory is written in the memory blocks at the addresses Addr01000 to Addr01002.

In step 1101, the content acquisition unit 401 acquires content. In step 1102, aiming to generate key information for encrypting the content, the memory block selection unit 402 selects N unwritten memory blocks in the WORM medium. Referring to FIGS. 7A and 7B, three memory blocks are selected. In step 1103, the WORM media reading/writing unit 405 writes to the WORM medium the addresses of the selected unwritten memory blocks as the address table AddrTableA.data 1009. In step 1104, the WORM media reading/writing unit 405 writes a different data value in M memory blocks out of the N selected memory blocks (M<N). The different data value maybe, for example, a fixed value or a random number. Specifically, referring to FIGS. 7A and 7B, the WORM media reading/writing unit 405 overwrites the data value 0x00000000 at the address Addr01000 with 0x10110101, and the data value 0x00000000 at the address Addr01002 with 0x11011000. In step 1105, the WORM media reading/writing unit 405 generates key information by using the data of the N selected memory blocks as a seed set after completion of the above-mentioned processing for overwriting data values. In step 1106, the encryption unit 404 encrypts the target content by using the key information. Then, the WORM media reading/writing unit 405 writes to the WORM medium the encrypted content (ContentA.jpg) acquired in step 1104. The above-mentioned steps enable producing a state of written data values as illustrated in FIGS. 7A and 7B.

Processing performed by the media viewing apparatus 102 in the second exemplary embodiment will be briefly described below. First of all, the media viewing apparatus 102 acquires the encrypted content (ContentA.jpg 1008 in FIG. 7B). Then, the media viewing apparatus 102 acquires N data values as a seed set from the addresses Addr01000 to Addr01002 based on the address table AddrTableA.data 1009 in FIG. 7B. Then, the media viewing apparatus 102 generates key information from the seed set and then decrypts the encrypted content by using the key information. Then, the user views the decrypted content by using various methods. When the decrypted content is sound, it is output from a speaker.

Processing performed by the media destruction apparatus 103 in the second exemplary embodiment will be described below. First of all, the address acquisition unit 602 reads the address table AddrTableA.data 1009 in FIG. 7B from the WORM medium. Then, the memory block writing unit 601 writes a data value different from the currently written initial value in (N−M) memory blocks (unwritten memory blocks) out of the N addresses (memory blocks). Unwritten memory blocks may be determined by using a function of the WORM medium, or overwriting processing may be applied to all of N memory blocks. In the latter case, since overwriting written memory blocks is inhibited by the WORM medium, data values only in unwritten memory blocks will be overwritten.

Figure 10:
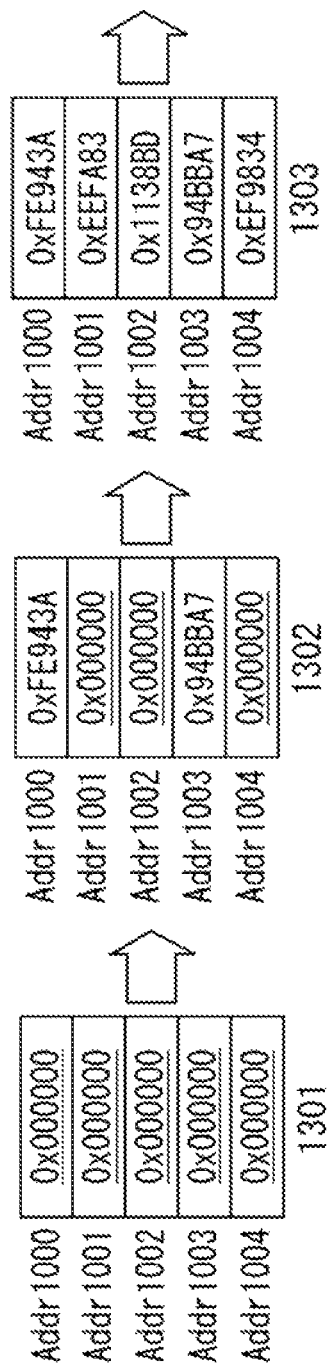
FIG. 10 illustrates a state transition of a memory block to be used as a seed set according to the second exemplary embodiment of the present invention.

FIG. 10 illustrates exemplary processing for overwriting data values in a plurality of memory blocks used as a seed set in the present exemplary embodiment. Referring to FIG. 10, memory blocks specified by five addresses Addr1000 to Addr1004 are used as a seed set. Memory block states 1301, 1302, and 1303 indicate statuses of the above-mentioned memory blocks at the addresses Addr1000 to Addr1004 at three different timings: before content is written, after content is written, and after the content is destroyed, respectively. Specifically, in the memory block state 1301 before the content is written, the initial value 0x000000 is written in all of the memory blocks. These memory blocks are rewritable (underlined) memory blocks having the initial value 0x000000 written therein.

When writing the content, the media writing apparatus 101 overwrites data values in the memory blocks at the addresses Addr1000 and Addr1003 with any values according to the processing of the flow chart illustrated in FIG. 8. Then, the media writing apparatus 101 generates key information by using the memory block state 1302 as a seed set, encrypts the content, and writes the encrypted content to the WORM medium. Then, the media destruction apparatus 103 writes data values in the addresses Addr1001, Addr1002, and Addr1004 to which the media writing apparatus 101 has not yet overwritten, to produce the memory block state 1303. Therefore, to correctly decrypt the encrypted content after the media destruction apparatus 103 has destroyed the content, an aggressor needs to correctly select the memory block addresses Addr1001, Addr1002, and Addr1004 out of addresses Addr1000 to Addr1004 and generate key information by using data values of the selected memory blocks as an initial value. This means that it can be made difficult for the aggressor to attack.

With the above-mentioned method, for example, when a third person attempts to generate key information assuming that all of seed sets are the initial value 0x00000000, the third person cannot generate correct key information unless the third person correctly selects (N−M) unwritten memory blocks, i.e., memory blocks other than M memory blocks (written memory blocks overwritten in encryption processing) out of the N memory blocks for use as an initial value. In other words, the above-mentioned method eliminates the possibility that the encrypted content is easily decrypted.

With the above-mentioned method, an ill-intentioned third person cannot generate correct key information unless the third person identifies which part of the N memory blocks needs to be recognized as the above-mentioned M memory blocks. In other words, taking measures for increasing as much as possible the number of combinations of selecting M memory blocks out of the N memory blocks will eliminate the possibility that the encrypted content is decoded.

Further, the following modification may be applied to the present exemplary embodiment where decoding M memory blocks is difficult as mentioned above. For example, in the present exemplary embodiment, although the initial value written in unwritten memory blocks is used as a seed set, a data value different from the initial value may also be used as a seed set. For example, when it can be determined that the address table points to unwritten memory blocks, it is also possible to acquire from other memory blocks the same value as an initial value (for example, 0x00000000) that should have been written in unwritten memory blocks. For example, suppose a case where the WORM medium is a compact disc recordable (CD-R) with which data cannot be read from unwritten memory blocks.

In this case, it is desirable to acquire the above-mentioned predetermined value (0x00000000) from other memory blocks instead of the initial value (0x00000000) and use the value as a part of the seed set, based on a determination that a data value cannot be read from memory blocks. In the first exemplary embodiment in which a seed set is acquired from one memory block, it is not desirable that the above-mentioned predetermined value is shared by a plurality of apparatuses. However, in the second exemplary embodiment in which it is difficult to identify which M memory blocks out of the N memory blocks store the initial value, the possibility that the encrypted content is decoded by an ill-intentioned third person is low even if the third person knows a rule of using the predetermined value.

The media writing apparatus 101 selects at random M memory blocks out of the N memory blocks so that the third person cannot predict the M memory blocks. Taking measures in this way makes it difficult, after the media destruction apparatus 103 has destroyed (overwritten) a part of the seed set, to predict which portion is a changed portion of the seed set. In other words, the possibility that the encrypted content is illicitly restored can be reduced. Even in this case, before the media destruction apparatus 103 destroys a part of the seed set, the media viewing apparatus 102, for example, can decrypt the encrypted content without taking particular measures.

<Modification>

In the above-mentioned exemplary embodiments, when sequentially writing a plurality of encrypted contents, data must not be destroyed without intention of an owner of the WORM medium. For example, in writing second and subsequent encrypted contents, an unwritten memory block to be referenced as a first seed set must not be changed. Further, in writing third and subsequent encrypted contents, unwritten memory blocks to be referenced as first and second seed sets must not be changed. Thus, when writing a plurality of encrypted contents, it is effective to allocate an unused area (an area not used in the file system configuration) as the above-mentioned unwritten memory blocks. For example, a file system such as file allocation table (FAT) performs data management based on an allocation unit having a size of 2048 bytes. Therefore, when a file having a size of less than 2048 bytes is written, an unused data area (an area not written by the file system) occurs. For example, when 1024 bytes of data are written in an allocation unit having a size of 2048 bytes, a data area including the remaining 1024 bytes becomes an unused data area not used by the file system. Specifically, when a memory block is a data area having a size of 32 bytes, 32 memory blocks can be used as a seed set (since 32×32=1024 bytes). There is a little possibility that these memory blocks are unintentionally overwritten by other data writing.

Figure 11:
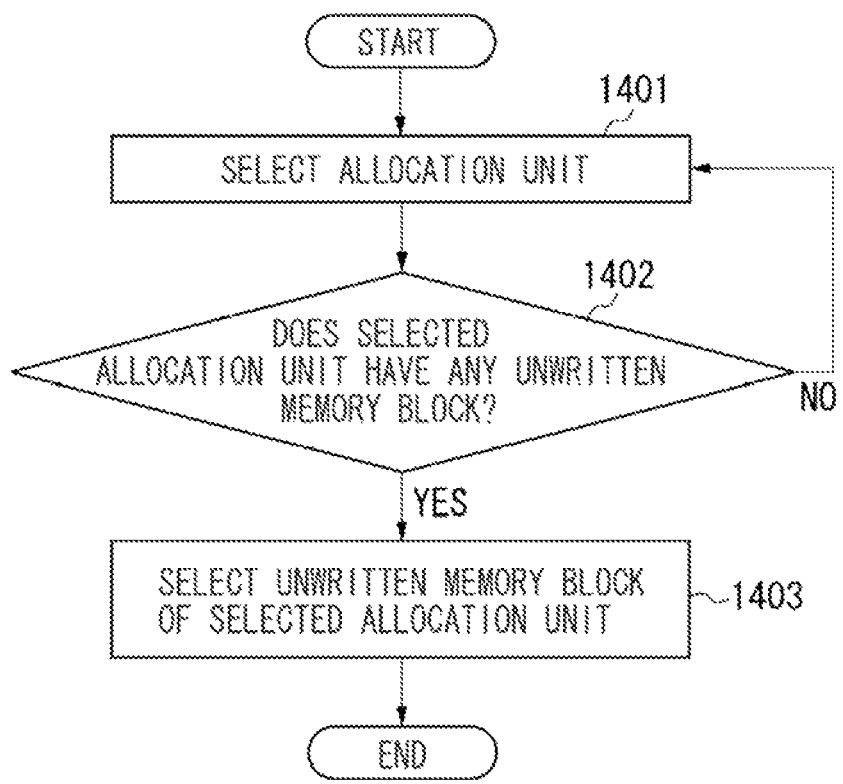
FIG. 11 is a flow chart illustrating processing for selecting a memory block according to the second exemplary embodiment of the present invention.

FIG. 11 is a flow chart illustrating exemplary processing for selecting an unused memory block by the media writing apparatus 101. When applying the above-mentioned method to the first exemplary embodiment, the flow chart in FIG. 4 is applied to writing processing, with step 702 in FIG. 4 replaced with the flow chart in FIG. 11. When applying the above-mentioned method to the second exemplary embodiment, the flow chart in FIG. 8 is applied to writing processing, with step 1102 in FIG. 8 replaced with the flow chart in FIG. 11. In step 1401, the memory block selection unit 402 selects an allocation unit to be managed by the file system. In step 1402, the media writing apparatus 101 determines whether the allocation unit selected by the memory block selection unit 402 is less than a data management unit of the file system and therefore produces any unwritten memory block. When the media writing apparatus 101 determines that the selected allocation unit produces any unwritten memory block (YES in step 1402), the processing proceeds to step 1403. In step 1403, the media writing apparatus 101 selects the unwritten memory blocks of the selected allocation unit as a seed set. Otherwise, when the media writing apparatus 101 determines that the selected allocation unit produces no unwritten memory block (NO in step 1402), the processing returns to step 1401. In step 1401, the media writing apparatus 101 selects another allocation unit and searches for any unwritten memory block.

When an allocation unit includes a plurality of memory blocks, selecting unwritten memory blocks included in an unused area for use as a seed set enables preventing the seed set from being overwritten (erased) without intention of the owner of the WORM medium.

The above-mentioned exemplary embodiments disables correct reading of data written to a write-once recording medium without requiring physical destruction of the write-once recording medium.

Aspects of the present invention can also be realized by a computer of a system or apparatus (or devices such as a central processing unit (CPU), a micro-processing unit (MPU), and/or the like) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2010-104303 filed Apr. 28, 2010 and No. 2011-058102 filed Mar. 16, 2011, which are hereby incorporated by reference herein in their entirety.

What is claimed is:

1. A data processing system including a media writing apparatus and a media destruction apparatus,
   wherein the media writing apparatus comprises:
   an acquisition unit configured to acquire content;
   an encryption unit configured to generate an encryption key by using an initial value written in an unwritten memory block in a write-once recording medium, and to encrypt the content by using the encryption key; and
   a writing unit configured to write to the write-once recording medium the encrypted content and an address table for identifying the memory block storing the initial value used for generating the encryption key, and
   wherein the media destruction apparatus comprises:
   a writing unit configured to change the initial value written in the memory block identified by the address table to a different data value, to prevent the encryption key from being generated.

2. A data processing apparatus capable of reading and writing data from/to a write-once recording medium, the data processing apparatus comprising:
   an acquisition unit configured to acquire content;
   an encryption unit configured to generate an encryption key by using an initial value written in an unwritten memory block in the write-once recording medium, and to encrypt the content by using the encryption key; and
   a writing unit configured to write to the write-once recording medium the encrypted content and an address table for identifying the memory block storing the initial value used for generating the encryption key,
   wherein the writing unit changes the initial value written in the memory block identified by the address table to a different data value, to prevent the encryption key from being generated.

3. A method for controlling a data processing apparatus capable of reading and writing data from/to a write-once recording medium, the method comprising:
acquiring content;
generating an encryption key by using an initial value written in an unwritten memory block in the write-once recording medium, and encrypting the content by using the encryption key;
writing to the write-once recording medium the encrypted content and an address table for identifying the memory block storing the initial value used for generating the encryption key; and
changing the initial value written in the memory block identified by the address table to a different data value, to prevent the encryption key from being generated.

4. A non-transitory computer-readable storage medium storing a program which is read out and executed by a computer so as to cause the computer to carry out steps comprising:
acquiring content;
generating an encryption key by using an initial value written in an unwritten memory block in a write-once recording medium, and to encrypt the content by using the encryption key; and
writing to the write-once recording medium the encrypted content and an address table for identifying the memory block storing the initial value used for generating the encryption key; and
changing the initial value written in the memory block identified by the address table to a different data value, to prevent the encryption key from being generated.

5. A data processing system including a media writing apparatus and a media destruction apparatus,
wherein the media writing apparatus comprises:
an acquisition unit configured to acquire content;
an encryption unit configured to identify N unwritten memory blocks in a write-once recording medium, to change an initial value in M memory blocks out of the N memory blocks to a different data value, to generate an encryption key by using a data group written in the N memory blocks, and to encrypt the content by using the encryption key; and
a writing unit configured to write to the write-once recording medium the encrypted content and an address table for identifying the N memory blocks used for generating the encryption key, and
wherein the media destruction apparatus comprises:
a writing unit configured to change an initial value in (N-M) unwritten memory blocks out of the N memory blocks identified by the address table to a different data value, to prevent the encryption key from being generated.

6. A data processing apparatus capable of reading and writing data from/to a write-once recording medium, the data processing apparatus comprising:
an acquisition unit configured to acquire content;
an encryption unit configured to identify N unwritten memory blocks in the write-once recording medium, to change an initial value in M memory blocks out of the N memory blocks to a different data value, to generate an encryption key by using a data group written in the N memory blocks, and to encrypt the content by using the encryption key; and
a writing unit configured to write to the write-once recording medium the encrypted content and an address table for identifying the N memory blocks used for generating the encryption key,
wherein the writing unit changes an initial value in (N-M) unwritten memory blocks out of the N memory blocks identified by the address table to a different data value, to prevent the encryption key from being generated.

7. A method for controlling a data processing apparatus capable of reading and writing data from/to a write-once recording medium, the method comprising:
acquiring content;
identifying N unwritten memory blocks in the write-once recording medium, changing an initial value in M memory blocks out of the N memory blocks to a different data value, generating an encryption key by using a data group written in the N memory blocks, and encrypting the content by using the encryption key;
writing to the write-once recording medium the encrypted content and an address table for identifying the N memory blocks used for generating the encryption key; and
changing an initial value in (N-M) unwritten memory blocks out of the N memory blocks identified by the address table to a different data value, to prevent the encryption key from being generated.

8. A non-transitory computer-readable storage medium storing a program which is read out and executed by a computer so as to cause the computer to carry out steps comprising:
acquiring content;
identifying N unwritten memory blocks in a write-once recording medium, to change an initial value in M memory blocks out of the N memory blocks to a different data value, to generate an encryption key by using a data group written in the N memory blocks, and to encrypt the content by using the encryption key;
writing to the write-once recording medium the encrypted content and an address table for identifying the N memory blocks used for generating the encryption key; and
changing an initial value in (N-M) unwritten memory blocks out of the N memory blocks identified by the address table to a different data value, to prevent the encryption key from being generated.

* * * * *